United States Patent
Kasper et al.

(10) Patent No.: US 10,932,226 B2
(45) Date of Patent: Feb. 23, 2021

(54) METHODS AND APPARATUS FOR COMMUNICATING RESOURCE ESTABLISHMENT DETAILS OVER EMBMS

(71) Applicant: Motorola Solutions, Inc., Chicago, IL (US)

(72) Inventors: Melissa D. Kasper, Palatine, IL (US); Irina Kleyman, Wheeling, IL (US); Sanjaykumar S. Karpoor, Buffalo Grove, IL (US); Peter M. Drozt, Prairie Grove, IL (US)

(73) Assignee: Motorola Solutions, Inc., Chicago, IL (US)

( * ) Notice: Subject to any disclaimer, the term of this patent is extended or adjusted under 35 U.S.C. 154(b) by 77 days.

(21) Appl. No.: 16/232,480

(22) Filed: Dec. 26, 2018

(65) Prior Publication Data
US 2020/0213972 A1    Jul. 2, 2020

(51) Int. Cl.
*H04W 72/00* (2009.01)
*H04W 76/40* (2018.01)
*H04W 4/08* (2009.01)
*H04W 72/10* (2009.01)

(52) U.S. Cl.
CPC .......... *H04W 72/005* (2013.01); *H04W 4/08* (2013.01); *H04W 72/10* (2013.01); *H04W 76/40* (2018.02)

(58) Field of Classification Search
None
See application file for complete search history.

(56) References Cited

U.S. PATENT DOCUMENTS

| 2005/0118992 | A1 | 6/2005 | Jeong et al. |
| 2010/0128649 | A1* | 5/2010 | Gonsa ............... H04W 36/0007 370/312 |
| 2012/0172028 | A1 | 7/2012 | Korus et al. |
| 2013/0194999 | A1 | 8/2013 | Anchan |
| 2017/0078371 | A1* | 3/2017 | Kodaypak ............... H04W 4/06 |
| 2017/0086033 | A1 | 3/2017 | Akesson et al. |
| 2017/0264647 | A1* | 9/2017 | Jerichow ............... H04L 63/205 |

OTHER PUBLICATIONS

International Search Report and Written Opinion for PCT Patent Application No. PCT/US2019/067368, dated Mar. 17, 2020.
3GPP 5G Technical Specification: Universal Mobile Telecommunications System (UMTS); LTE; Group Communication System Enablers for LTE (GCSE_LTE); MB2 reference pointe; Stage 3 (3GPP TS 29.468 version 15.4.0 Release 15) ETSI TS 129 468 V15.4.0, Oct. 2018, 44 pages.
3GPP 5G Technical Specification: LTE; Group Communication System Enablers for LTE (GCSE_LTE); Stage 2 (3GPP TS 23.468 version 15.0.0 Release 15) ETSI TS 123 468 V15.0.0, Jul. 2018, 32 pages.

* cited by examiner

*Primary Examiner* — Kodzovi Acolatse
*Assistant Examiner* — The Hy Nguyen
(74) *Attorney, Agent, or Firm* — Baker Botts L.L.P.

(57) ABSTRACT

A method and apparatus for communicating resource activation details are disclosed. A method of resource activation by a group application server may include requesting, by the group application server, establishment of a distributed resource to be established in a broadcast area and an indication of profess to establish the distributed resource, and receiving a first notification at the group application server. The first notification may be indicative of progress in the establishment of the distributed resource and may be received before the distributed resource is established in the broadcast area.

20 Claims, 5 Drawing Sheets

METHODS AND APPARATUS FOR COMMUNICATING RESOURCE ESTABLISHMENT DETAILS OVER EMBMS

BACKGROUND OF THE INVENTION

Many portable communication devices, such as mobile phones, are utilized to perform different types of communication. Communication systems supporting these types of devices may transport one or more media streams using an evolved Multimedia Broadcast/Multicast Service (eMBMS) bearer in a Third Generation Partnership Project (3GPP) infrastructure, which in turn may support Long Term Evolution (LTE) transmission. LTE is a radio technology that provides for an IP-based network architecture that is designed to operate with legacy infrastructures, such as general packet radio service (GPRS). eMBMS may also provide mission critical push-to-talk (PTT) service, such as mission critical push-to-talk over long-term evolution (MCPTT over LTE).

eMBMS provides for bearer resource activation in which resources are not available until all resources are activated. Moreover, eMBMS may provide for requests of bearers in a broadcast area with an acknowledgement that a request has been received and an assumption bearer resource activation is complete after a period of time. However, there are situations in which it may not be feasible to wait for full resource activation. Moreover, there are situations, such as for mission critical communications, in which it may not be feasible to activate resources with no visibility of the status in activating individual resources.

There exists a limitation with respect to bearer resource activation to use bearer resources before waiting for full resource activation to be achieved. This functionality typically may not be achieved by simply using bearer resources without feedback about partial resource establishment. Moreover, there exists a limitation with respect to bearer resource activation of particular nodes and cells within a broadcast area for mission critical communications. This functionality typically may not be achieved simply by activating all resources distributed across the entire broadcast area or by activating multiple bearers among smaller broadcast areas.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
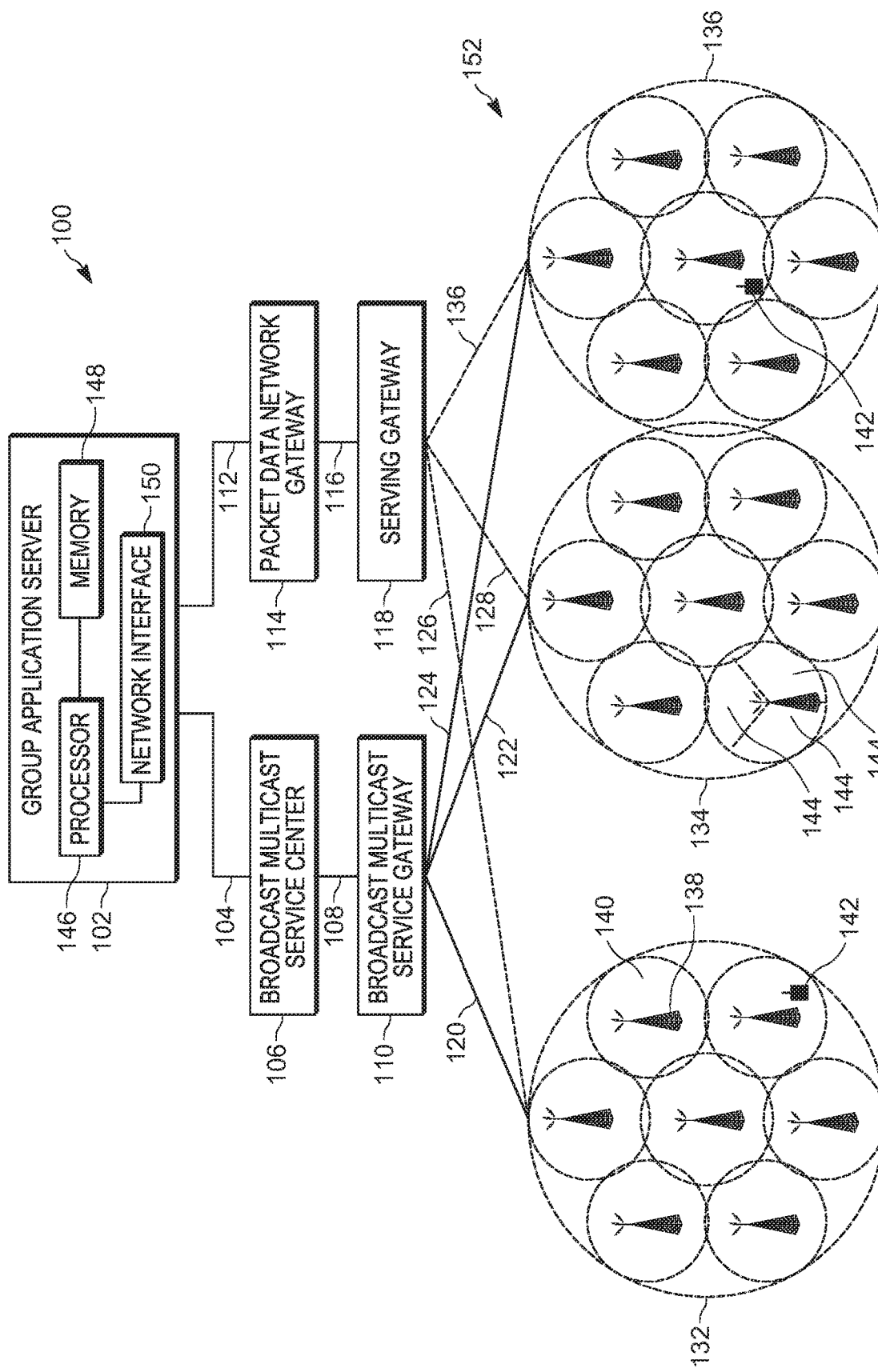
FIG. 1 is a block diagram illustrating an example communication system supporting communication of resource activation details, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatuses for communicating resource reservation details.

In one embodiment, a disclosed method of resource activation by a group application server includes requesting, by the group application server, establishment of a distributed resource and an indication of progress to establish the distributed resource, and receiving a first notification at the group application server. The distributed resource may be requested to be established in a broadcast area. The first notification may be indicative of progress in the establishment of the distributed resource and the first notification may be received before the distributed resource is established in the broadcast area.

In one embodiment, a disclosed group application server for resource activation includes a memory and a processor. The processor is coupled to the memory. The processor may be configured to request establishment of a distributed resource in a broadcast area, and receive a first notification. The request for establishment of the distributed resource may include requesting an indication of progress to establish the distributed resource to be established. The first notification may be indicative of progress in the establishment of the distributed resource and the first notification may be received before the distributed resource is established in the broadcast area.

In at least some embodiments of the present disclosure, the systems, methods, and apparatuses as described herein for communicating resource reservation details may support a notification indicative of progress in the establishment of the distributed resource. Unlike systems, methods, and apparatuses that receive a status indicating that the distributed resource has been established, the systems, methods, and apparatuses as described herein may support receiving a notification indicative of progress in the establishment of the distributed resource after the request is accepted and before the entire distributed resource has been established.

In at least some embodiments of the present disclosure, the systems, methods, and apparatuses as described herein for communicating resource establishment details may support requesting an indication of progress for at least one of: one or more predetermined percentages of the distributed resource being established in the broadcast area and a specified set of one or more cells of one or more nodes in the broadcast area. Unlike systems, methods, and apparatuses that employ a status indicating that all or none of the distributed resource was established or that employ general resource availability in a non-distributed area, such as for a unicast bearer or resource availability within a critical site, the systems, methods, and apparatuses as described herein may support one or more notifications of the establishment of the distributed resource at one or more predetermined percentages or at a specified set of one or more cells of one or more nodes within the broadcast area.

In at least some embodiments of the present disclosure, the systems, methods, and apparatuses as described herein for communicating resource establishment details may support requesting establishment of the distributed resource with a list of supported features. Unlike systems, methods, and apparatuses that employ a list of supported features indicating support for a heartbeat for restoration of communication interfaces, the systems, methods, and apparatuses as described herein may support a list of supported features indicating support for at least one of: a resource activation percentage notification and a critical resource availability notification.

In at least some embodiments of the present disclosure, the systems, methods, and apparatuses as described herein for communicating resource establishment details may support performing one or more actions on a group communication service call. Unlike systems, methods, and apparatuses that employ a status indicating that all or none of the distributed resource was established or that employ general resource availability in a non-distributed area, the systems, methods, and apparatuses as described herein may support based on the first notification indicative of progress in the establishment of the distributed resource to perform one or more actions, including admitting, rejecting, resuming, and suspending a call.

Referring now to FIG. 1, there is provided a block diagram illustrating an example communication system 100 supporting communication of resource activation details. Communication system 100 may include a group application server 102 for requesting activation of bearer resources for the transport of data, including but not limited to push-to-talk, voice, data, and video communications. In various embodiments, group application server 102 may be implemented as a group communication service application server (GCS-AS), such as a Push-to-Talk (PTT) controller, which may be included in the application level of communication system 100, which may also be referred to as the application domain. Group application server 102 may be implemented with processor 146 that is coupled to memory 148 and network interface 150. Memory 148 may store instructions which when executed by processor 146 provide for group application server 102 operation in system 100. Network interface 150 may include one or more network devices coupled to one or more elements of system 100. Although a single processor 146 and memory 148 are shown, processor 146 may include one or more processors and memory 148 may include one or more types of memories and one or more memory modules.

Group application server 102 may be coupled via interface 104 to broadcast multicast service center 106 to activate bearer resources for the transport of data. Although one group application server 102 is illustrated, communication system 102 may include a plurality of group application servers coupled to broadcast multicast service center 106. In various embodiments, broadcast multicast service center 106 may be implemented as an eMBMS Broadcast Multicast Service Centre (BM-SC). Broadcast multicast service center 106 may provide for the activation, deactivation, and modification of resources for one or more eMBMS bearers. Requests to activate, deactivate, or modify resources for eMBMS bearers sent from group application server 102 may be received by broadcast multicast service center 106 over interface 104. In various embodiments, interface 104 may be implemented as one or more references points or multicast broadcast protocol interfaces, such as an MB2-C (control plane interface) and an MB2-U (user plane interface). Although one broadcast multicast service center 106 and one interface 104 to group application server 102 is illustrated, communication system 102 may include a plurality of broadcast multicast service centers 106 coupled via a plurality of interfaces 104 to group application server 102. In some embodiments, broadcast multicast service center 106 may be included in the application level of communication system 102.

Broadcast multicast service center 106 may be coupled via interface 108 to broadcast multicast service gateway 110. Group application server 102 may send data for one or more user equipment 142 to broadcast multicast service center 106 to be forwarded via interface 108 to broadcast multicast service gateway 110. In various embodiments, interface 108 may be implemented in accordance with one or more reference points, such as an SGmb and an SGi-mb. Interface 108 may be used for sending data to user equipment 142. Control messages, such as messages to activate resources for a bearer, may also be communicated via interface 108. In communication system 100, broadcast multicast service gateway 110 may provide for the distribution of broadcast or multicast communication traffic across radio access network 152. In various embodiments, broadcast multicast service gateway 110 may be implemented as an eMBMS Broadcast Multicast Service Gateway (MBMS GW).

Group application server 102 may be coupled to packet data network gateway (PDN GW) 114 via interface 112 for unicast communication. In various embodiments, interface 112 may be implemented in accordance with one or more reference points or interfaces, such as an SGi and a Rx. PDN GW 114 may be coupled to provide one or more policy and filtering operations, including but not limited to policy enforcement and packet filtering, screening, and interception. PDN GW 114 may serve as a conduit for non-3GPP communications, such as code-division multiple access (CDMA) communications. PDN GW 114 may be coupled to serving gateway (SGW) 118 via interface 116. In communication system 100, SGW 118 may provide for communication of unicast communication traffic to a particular destination in radio access network 152.

In various embodiments, radio access network 152 may be implemented as an evolved universal mobile telecommunications system terrestrial radio access network (E-UTRAN). Radio access network 152 may also be referred to as a broadcast area. Radio access network 152 may include one or more service areas (132, 134 and 136). In some embodiments, a service area (e.g., service area 134) may overlap in geographic area with another service area (e.g., service area 136). Each service area may be coupled to broadcast multicast service gateway 110 via one or more links (120, 122, and 124) and to SGW 118 via one or more links (126, 128, and 130).

A service area (132, 134, or 136) may include a plurality of nodes (138). In various embodiments, a node 138 may be implemented as evolved nodeBs (eNodeBs), such as a base transceiver station. Each node 138 may provide for communications across a coverage area 140, which may overlap in geographic area with the coverage area of another node. A node 138 may include a plurality of cells 144, which may provide for communication to one or more user equipment (UE) 142. A node 138 may serve as an intermediary in communications between UE 142 and broadcast multicast service gateway 110. UE 142 may be a device that receives broadcast multicast communications, such as a vehicle, radio, mobile phone, mobile data terminal, laptop computer, tablet computer, or personal digital assistant (PDA). UE 142 may be communicatively coupled to one or more cells in one or more nodes. Although three service areas each with seven coverage areas are shown, any number of services areas with any plurality of coverage areas may be used in radio access network 152.

Group application server 102 may request the activation of a distributed resource from broadcast multicast service center 106. The request may reserve resources to be activated for an eMBMS bearer of communications. The distributed resource may be an eMBMS Bearer in an LTE network. The request may include a list of features supported by group application server 102. For example, the list may indicate that group application server 102 supports a resource activation percentage notification. Group application server 102 may provide one or more distributed resource activation thresholds, such as 30, 50, and 90 percent activation thresholds, in the request to activate the distributed resource. Although three resource activation thresholds are described, any suitable number of thresholds may be provided by group application server 102.

As another example, the list may indicate that group application server 102 supports a critical resource availability notification. Group application server 102 may provide an indication of which distributed resources in radio access network 152 may be necessary for mission critical communications. The indication may specify a set of one or more cells in a geographic area or a set of one or more cells in one or more nodes that is in a service area. Skilled artisans will appreciate that the cells and nodes may be selected based on a particular mission critical communication, including but not limited to the selection of one or more nodes in the central portion of the service area.

In response to the request to activate the distributed resource, the broadcast multicast service center 106 may send an acceptance of the request to group application server 102 and start activating resources. Broadcast multicast service center 106 may determine which notifications to provide to group application server 102 based on the list of features supported by group application server 102. For example, group application server 102 may support a resource activation percentage notification with three resource activation thresholds corresponding to 30, 50 and 90 percent of the resource being established. In response, broadcast multicast service center 106 may send a notification about the establishment of the distributed resource for each of the three resource activation thresholds. The notification may indicate which resource activation threshold has been satisfied. As another example, group application server 102 may support a critical resource availability notification specifying that one or more cells in one or more nodes of a service area be activated for mission critical communications. In response, broadcast multicast service center 106 may send a notification to group application server 102 indicating whether the activation of the specific resources requested was successful.

In response to a notification from broadcast multicast service center 106, group application server 102 may evaluate whether sufficient resources are established for a group communication service call. The group communication service call may have a pending or active status, which may indicate one or more characteristics of the group communication service call, including, but not limited to, whether the group communication service call is a confirmed or unconfirmed type of call, an emergency type of call or non-emergency type of group call, and whether the group communication service call has a high priority or low priority.

Sufficient resources for a group communication service call may be determined based on any suitable criteria including whether the group communication service call is confirmed, whether the group communication service call is an emergency communication, the priority assigned to the group communication service call, and whether the group communication service call is waiting on an eMBMS bearer or is using an eMBMS bearer. Group application server 102 may perform one or more actions based on the evaluation, including but not limited to admitting a group communication service call, rejecting a group communication service call, resuming a group communication service call, suspending or holding a group communication service call, or queuing a group communication service call. For example, a confirmed group communication service call may require a higher percentage of resources to be activated before the call is admitted than an unconfirmed group communication service call. As another example, an emergency group communication service call may require all resources be activated before the call is admitted.

Skilled artisans will appreciate that resource establishment as described herein may be used to activate new resources, deactivate existing resources, and modify existing resources to increase, decrease, or change the establishment of distributed resources.

Figure 2A:
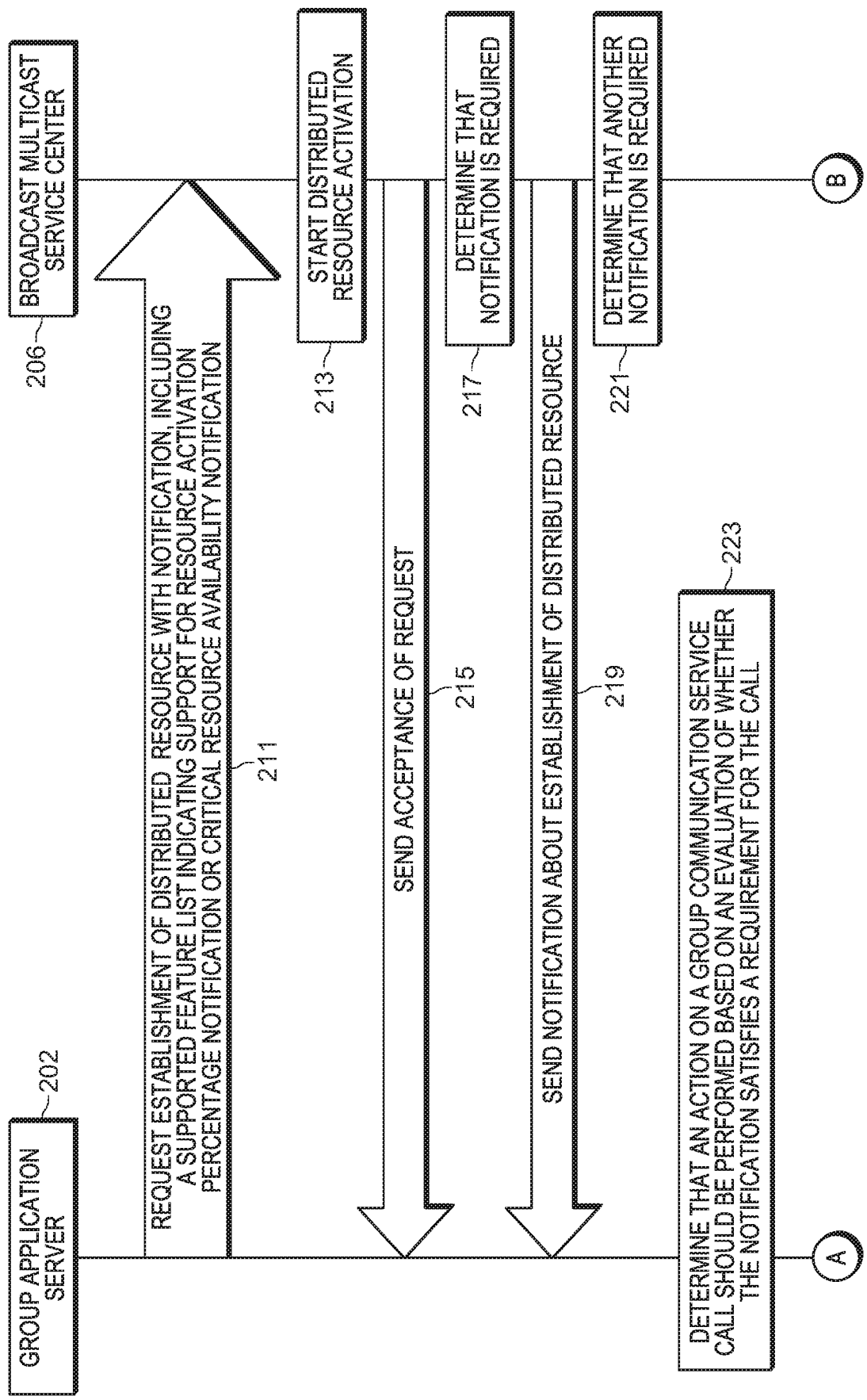
FIGS. 2A and 2B are a flowchart illustrating communication of resource establishment details, in accordance with some embodiments.
Figure 2B:
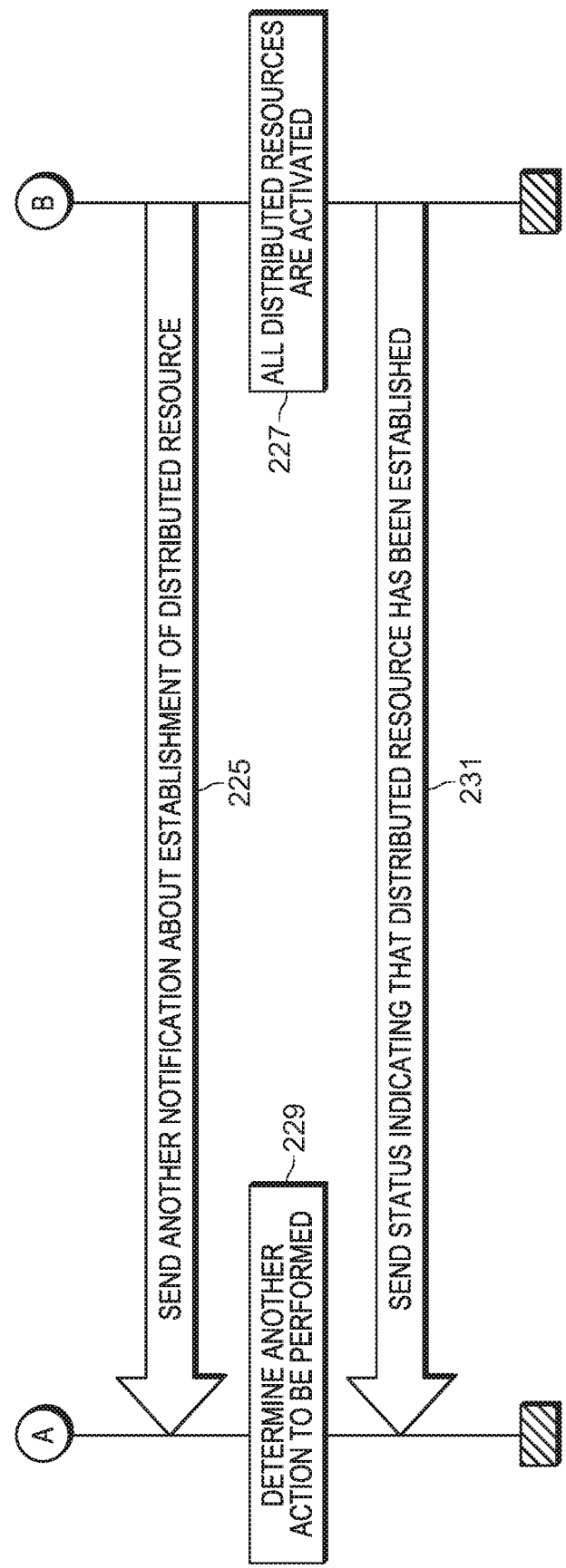

Referring now to FIGS. 2A and 2B, there is provided a flow diagram illustrating communication of resource establishment details in an example communication system 200 designed in accordance with some embodiments. Communication system 200 may include group application server 202 and broadcast multicast service center 206. Group application server 202 may request the establishment of distributed resource 211 in one or more radio access networks from broadcast multicast service center 206. In some embodiments, request 211 is a resource establishment request in a 3GPP group communication action-request (GAR) command that may be sent to one of a plurality of broadcast multicast service centers (206). Request 211 may include a request for broadcast multicast service center 206 to provide notification of partial resource activation. Group application server 202 may include in request 211 a request for an indication of progress when the distributed resource is being established. In some embodiments, the request for an indication may be provided by an attribute-value pair in request 211. Group application server 202 may include a supported feature list in request 211. The supported feature list may indicate support for one of more notification features, including but not limited to a resource activation percentage notification and a critical resource availability notification. Skilled artisans will appreciate that request 211 may include one or more requests for one or more eMBMS bearers to be established.

In some embodiments, group application server 202 may indicate support for a resource activation percentage notification. Group application server 202 may provide one or more resource activation thresholds, up to a maximum number of resource activation thresholds, to broadcast multicast service center 206. Broadcast multicast service center 206 may notify group application server 202 of partial resource establishment when the activation of the distributed resources reaches or exceeds a resource activation threshold. In some embodiments, group application server 202 may indicate support for a critical resource availability notification. Group application server 202 may specify which portions of the distributed resource in the radio access network are suitable for mission critical communications. Group application server 202 may select distributed resources at a fine-grain level within a broadcast area by specifying a set of one or more cells in a geographic area or a set of one or more cells in one or more nodes in a service area.

In response to request 211, broadcast multicast service center 206 may start distributed resource activation 213 and may send acceptance of the request 215. In some embodiments, acceptance of the request 215 is a resource establishment acknowledgement in a 3GPP group communication action-answer (GAA) command. The acceptance may indicate the duration for which the distributed resource for the eMBMS bearer will be reserved.

After distributed resource activation starts (213), broadcast multicast service center 206 may determine whether to notify group application server 202 (217) based on the amount of resources that have been established. The determination may be based on the list of features supported by group application server 202. For example, group application server 202 may support a resource activation percentage notification. Broadcast multicast service center 206 may determine whether the established resources satisfy a resource activation threshold predetermined by group application server 202. After a predetermined resource activation threshold is reached or exceeded, broadcast multicast service center 206 may determine that notification of partial resource establishment is required. As another example, group application server 202 may a support critical resource availability notification. Broadcast multicast service center 206 may determine whether the established resources match the resources specified in a request by group application server 202. When the established resources match the specified resources, broadcast multicast service center 206 may determine that notification of critical resource activation is required. Skilled artisans will appreciate that broadcast multicast service center 206 may determine that the resources specified in a request by group application service 202 may be unavailable for activation.

After broadcast multicast service center 206 determines that notification is required, broadcast multicast service center 206 may send a notification about the establishment of the distributed resource (219). In some embodiments, notification 219 may be received in a message that is a 3GPP group communication service notification-request (GNR) command. Notification (219) may specify one or more indications including, but not limited to, whether a resource activation threshold satisfied by the establishment of the distributed resource or whether the activation of critical resources was successful. Skilled artisans will appreciate that the notification may include a suitable indication of the resource activation threshold, including but not limited to whether a specified resource activation threshold is exceeded and the specific percentage of resources established. In some embodiments, acceptance of request 215 and notification 219 may be sent in the same communication. For example, the request may be accepted and a notification may be provided to indicate that little or no resources (e.g., 0%) have been established.

Group application server 202 may receive the notification and then determine that an action on a group communication service call should be performed based on an evaluation of whether the notification corresponds to sufficient resources for the group communication service call (223). The group communication service call may have a pending or active status, which may indicate one or more characteristics of the group communication service call, including, but not limited to, whether the group communication service call is a confirmed or unconfirmed type of call, an emergency type of call or non-emergency type of group call, and whether the group communication service call has a high priority or low priority. Sufficient resources for a group communication service call may be determined based on any suitable criteria including whether the group communication service call is confirmed, whether the group communication service call is an emergency communication, the priority assigned to the group communication service call, and whether the group communication service call is waiting on an eMBMS bearer or is using an eMBMS bearer. Group application server 202 may perform one or more actions based on the evaluation, including but not limited to admitting a group communication service call, rejecting a group communication service call, resuming a group communication service call, suspending or holding a group communication service call, or queuing a group communication service call. For example, group application server 202 may admit a group communication service call with a low priority based on an evaluation that the notification corresponds to a low percentage of the distributed resource having been established.

After sending a notification to group application server 202 about the establishment of the distributed resource (219), broadcast multicast service center 206 may determine that another notification is required (221). The determination may be similar to the previous determination (217) performed by broadcast multicast service center 206. Broadcast multicast service center 206 may send another notification to group application server 202 about the establishment of the distributed resource (225). In some embodiments, the notification 225 may be received in a message that is a 3GPP group communication service notification-request (GNR) command. Notification 225 may indicate that another resource activation threshold has been satisfied by partial resource activation. In response, group application server 202 may determine that another action is to be performed on a group communication service call (229). When all of the distributed resource is activated (227), broadcast multicast service center 206 may send a status to group application server 202 indicating that the distributed resource has been fully established (231). In some embodiments, the status may be received in a message that is a 3GPP group communication service notification-request (GNR) command.

Skilled artisans will appreciate that broadcast multicast service center 206 may continue to send notifications to group application server 202 after all of the distributed resource is activated based on whether failures or errors result in the percentage of activated resources to be reduced or the critical resources no longer being available.

Figure 3A:
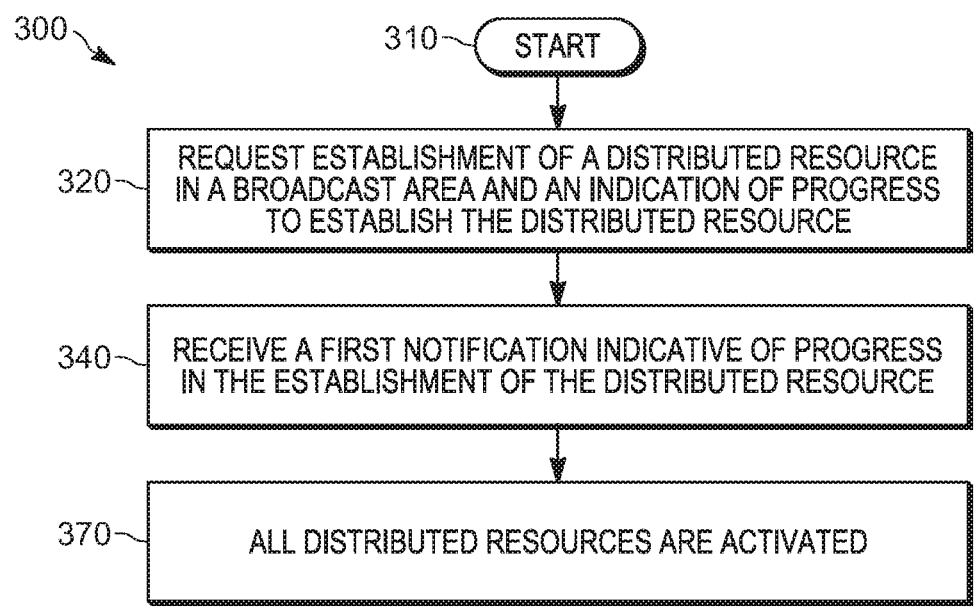
FIG. 3A is a flowchart illustrating a method for resource activation by communication of resource establishment details, in accordance with some embodiments.

Referring now to FIG. 3A, there is provided a flow diagram illustrating a method 300 for resource activation by communication of resource establishment details shown in accordance with some embodiments. While a particular order of operations is indicated in FIG. 3A for illustrative purposes, the timing and ordering of such operations may vary where appropriate without negating the purpose and advantages of the examples set forth in detail throughout the remainder of this disclosure. In some embodiments, one or more portions of method 300 may be executed at some predetermined periodic time period thereafter, in response to an activation, deactivation, or modification of distributed resources. For example, the request to establish the distributed resource may be modified before all of the distributed resource is established.

In this example embodiment, method 300 begins with block 310 in FIG. 3A and continues to block 320, where establishment of a distributed resource in a broadcast area and an indication of progress to establish the distributed resource is requested. The distributed resource may be for a bearer that may be assigned to a group communication service call. Group application server 202 may send the request (211) to broadcast multicast service center 206 as described for FIG. 2. The broadcast area may correspond to one or more service areas in a radio access network, such as service area 132 in radio access network 152 as described for FIG. 1. In some embodiments, the request to indicate progress in establishing the distributed resource may be provided by an attribute-value pair. The indication of progress to establish the distributed resource may be requested in a resource establishment request, which may be a 3GPP group communication action-request (GAR) command for one or more broadcast areas. The request may include a list of supported features. The features supported by group application server 202 may include support for one or more features, such as a resource activation percentage notification and a critical resource availability notification. The indication of progress may be requested for one or more predetermined percentages, such as 30 and 50 percent of the requested distributed resource. Group application server 202 may support a critical resource availability notification and the indication of progress may be requested for a specified set of one or more cells of one or more nodes in the broadcast area. For example, cells 144 of a node 138 in service area 134 may be specified as described for FIG. 1.

At block 340, a first notification indicative of progress in the establishment of the distributed resource may be received. For example, group application server 202 may receive the notification (219) from broadcast multicast service center 206 as described for FIG. 2. The first notification may be received after the acceptance of the request or in the same communication as the acceptance of the request. In some embodiments, the first notification may be received in a message that is a 3GPP group communication service notification-request (GNR) command. The first notification may specify that a predetermined resource activation threshold is satisfied or whether the activation of the critical resource was successful. The predetermined resource activation threshold may have been specified at block 320 in the request for the establishment of distributed resources. The request may have specified one or more resource activation thresholds at which a notification will be sent to indicate partial establishment of the distributed resource. In some embodiments, the first notification may indicate whether the predetermined resource activation threshold has been reached. At block 370, all distributed resources may be activated as requested after the first notification is received.

Figure 3B:
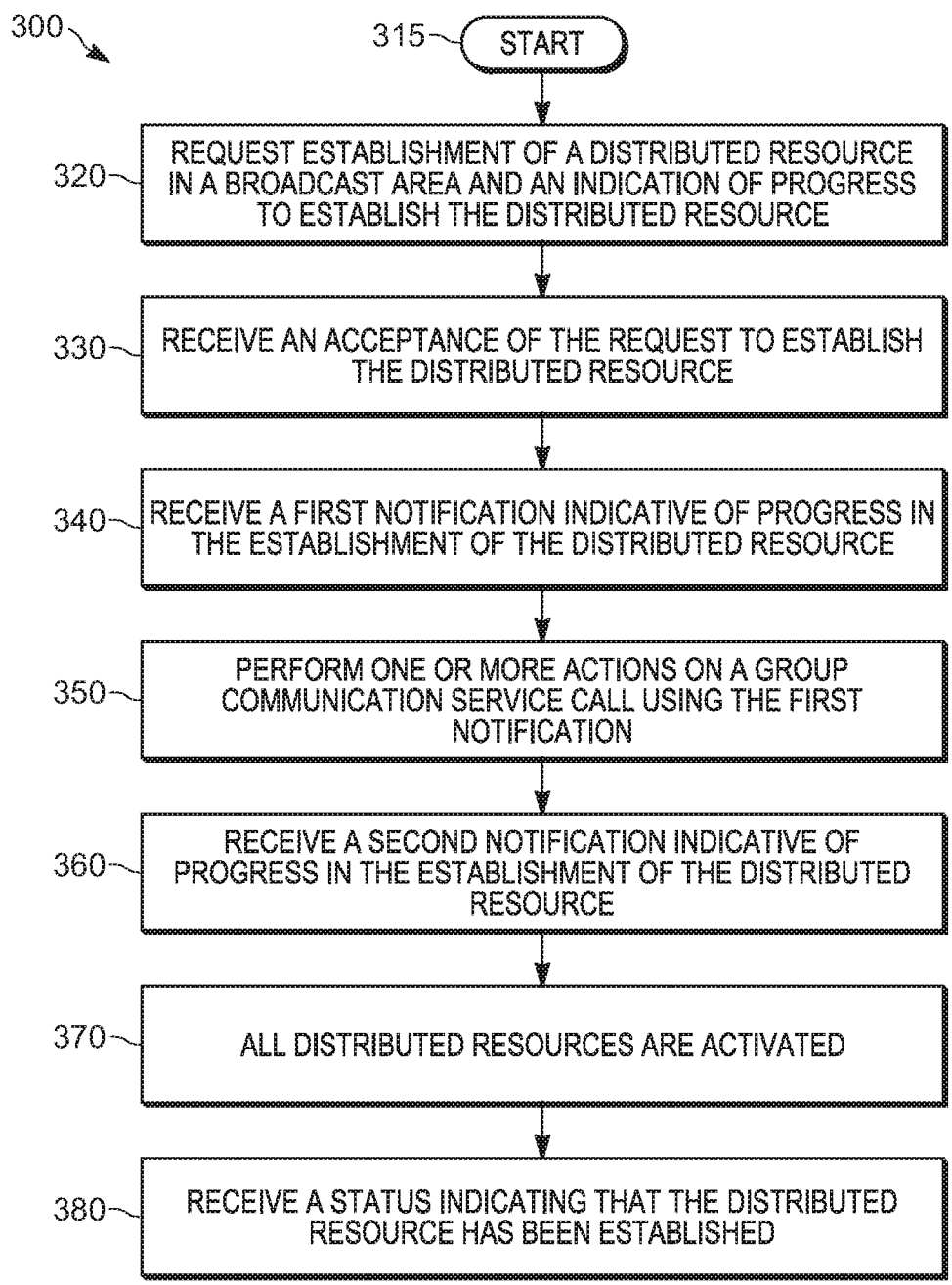
FIG. 3B is a flowchart illustrating a method for using partial resource establishment, in accordance with some embodiments.

Referring now to FIG. 3B, there is provided a flow diagram illustrating a method 305 for using partial resource establishment shown in accordance with some embodiments. While a particular order of operations is indicated in FIG. 3B for illustrative purposes, the timing and ordering of such operations may vary where appropriate without negating the purpose and advantages of the examples set forth in detail throughout the remainder of this disclosure. In some embodiments, one or more portions of method 305 may be executed at some predetermined periodic time period thereafter, in response to a change in established distributed resources. For example, an additional portion of the distributed resource may be established in excess of a predetermined threshold or a failure in a portion of the distributed resource may result in a critical resource requirement no longer being satisfied.

In this example embodiment, method 305 begins with block 315 in FIG. 3B and continues to block 320, where establishment of a distributed resource in a broadcast area and an indication of progress to establish the distributed resource is requested as described for block 320 in FIG. 3A. At block 330, an acceptance of the request to establish the distributed resource may be received. For example, group application server 202 may receive the acceptance (215) from broadcast multicast service center 206 as described for FIG. 2. Acceptance of the request may indicate the broadcast multicast service center 206 has begun activation of the requested distributed resource. In some embodiments, the acceptance may be a resource establishment acknowledgement in a 3GPP group communication action-answer (GAA) command. At block 340, a first notification indicative of progress in the establishment of the distributed resource may be received, as described for block 340 in FIG. 3A.

At block 350, in which one or more actions on a group communication service call may be performed based on the first notification. For example, group application server 202 may perform the actions (223) as described for FIG. 2. Group application server 202 may determine that actions on the group communication service call should be performed based on an evaluation of whether the notification corresponds to sufficient resources for the group communication service call. The group communication service call may have a pending or active status, which may indicate one or more characteristics of the group communication service call, including, but not limited to, whether the group communication service call is a confirmed or unconfirmed type of call, an emergency type of call or non-emergency type of group call, and whether the group communication service call has a high priority or low priority. Sufficient resources for a group communication service call may be determined based on any suitable criteria including whether the group communication service call is confirmed, whether the group communication service call is an emergency communication, the priority assigned to the group communication service call, and whether the group communication service call is waiting on an eMBMS bearer or is using an eMBMS bearer. Group application server may perform one or more actions based on the evaluation, including but not limited to admitting a group communication service call, rejecting a group communication service call, resuming a group communication service call, suspending or holding a group communication service call, or queuing a group communication service call. For example, group application server 202 may admit a group communication service call with a low priority based on an evaluation that the first notification corresponds to a low percentage of the distributed resource being established.

At block 360, a second notification indicative of progress in the establishment of the distributed resource may be received. The second notification may be received after the first notification. For example, the second notification may be received by group application server 202 as described by notification 225 for FIG. 2. As described for block 340 in FIGS. 3A and 3B, the second notification may be received in a message that is a 3GPP group communication service notification-request (GNR) command. The second notification may specify that a second predetermined resource activation threshold is satisfied. Group application server 202 may determine another action to be performed on a group communication service call based on receiving the second notification. For example, group application server 202 may suspend a group communication service call with a low priority and admit another group communication service call with a high priority based on an evaluation that the second notification corresponds to a high percentage of the distributed resource being established.

At block 370, all distributed resources may be activated as described for block 370 in FIG. 3A. At block 380, a status indicating that the distributed resource has been established may be received. For example, the status may be sent by broadcast multicast service center 206 to group application server 202 as described for FIG. 2. In some embodiments, the status may be received in a message that is a 3GPP group communication service notification-request (GNR) command. The status may be sent by the broadcast multicast service center after all of the distributed resource is activated.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A method of resource activation by a group application server including:
   requesting, by the group application server:
      establishment of a distributed resource, the distributed resource to be established in a broadcast area; and
      an indication of progress to establish the distributed resource;
   receiving a first notification at the group application server in response to requesting the establishment of the distributed resource and the indication of progress, wherein:
      the first notification is indicative of progress in the establishment of the distributed resource; and
      the first notification is received before the distributed resource is established in the broadcast area.

2. The method of claim 1, wherein the indication of progress to establish the distributed resource is requested for at least one of:
   one or more predetermined percentages of the distributed resource being established in the broadcast area; and
   a specified set of one or more cells of one or more nodes in the broadcast area.

3. The method of claim 1, wherein requesting, by the group application server, establishment of the distributed resource includes a list of supported features, wherein the list of supported features indicates support for at least one of:
a resource activation percentage notification; and
a critical resource availability notification.

4. The method of claim 1, wherein:
the indication of progress to establish the distributed resource is requested in a resource establishment request, wherein the resource establishment request is a third generation partnership project (3GPP) group communication action-request command for one or more broadcast areas; and
the first notification indicative of progress in the establishment of the distributed resource is received in a message, wherein the message is a third generation partnership project (3GPP) group communication service notification-request command.

5. The method of claim 1, wherein:
the indication of progress to establish the distributed resource is requested from a broadcast multicast service center; and
the first notification indicative of progress in the establishment of the distributed resource is received from the broadcast multicast service center.

6. The method of claim 1, further comprising:
performing, by the group application server, one or more actions on a group communication service call based on the first notification indicative of progress in the establishment of the distributed resource, the performed actions including at least one of:
admitting a call;
rejecting a call;
resuming a call; and
suspending a call.

7. The method of claim 1, further comprising:
receiving a second notification at the group application server, wherein:
the second notification is indicative of progress in the establishment of the distributed resource; and
the second notification is received after the first notification.

8. The method of claim 1, further comprising:
receiving, at the group application server, an acceptance of the request to establish the distributed resource to be established, wherein the acceptance is received before the first notification; and
receiving, at the group application server, a status indicating that the distributed resource has been established in the broadcast area, wherein the status is received after the first notification.

9. The method of claim 1, wherein requesting the indication of progress to establish the distributed resource is provided by an attribute-value pair.

10. The method of claim 1, wherein:
the indication of progress to establish the distributed resource is requested by a resource activation threshold; and
the first notification indicative of progress in the establishment of the distributed resource indicates whether the resource activation threshold has been reached.

11. A group application server for resource activation, the group application server comprising:
a memory;
a processor coupled to the memory, the processor configured to:
request establishment of a distributed resource in a broadcast area, wherein the request for establishment of the distributed resource includes requesting an indication of progress to establish the distributed resource to be established;
receive a first notification in response to the request for establishment of the distributed resource and the indication of progress, wherein the first notification is indicative of progress in the establishment of the distributed resource and is received before the distributed resource is established in the broadcast area.

12. The group application server of claim 11, wherein the indication of progress to establish the distributed resource is requested for at least one of:
one or more predetermined percentages of the distributed resource being established in the broadcast area; and
a specified set of one or more cells of one or more nodes in the broadcast area.

13. The group application server of claim 11, wherein the request to establish the distributed resource includes a list of supported features, wherein the list of supported features indicates support for at least one of:
a resource activation percentage notification; and
a critical resource availability notification.

14. The group application server of claim 11, wherein:
the indication of progress to establish the distributed resource is requested in a resource establishment request, wherein the resource establishment request is a third generation partnership project (3GPP) group communication action-request command for one or more broadcast areas; and
the first notification indicative of progress in the establishment of the distributed resource is received in a message, wherein the message is a third generation partnership project (3GPP) group communication service notification-request command.

15. The group application server of claim 11, wherein:
the indication of progress to establish the distributed resource is requested from a broadcast multicast service center; and
the first notification indicative of progress in the establishment of the distributed resource is received from the broadcast multicast service center.

16. The group application server of claim 11, wherein the processor is further configured to perform one or more actions on a group communication service call based on the first notification indicative of progress in the establishment of the distributed resource, the actions including at least one of:
admitting a call;
rejecting a call;
resuming a call; and
suspending a call.

17. The group application server of claim 11, wherein the processor is further configured to receive a second notification, wherein the second notification is indicative of progress in the establishment of the distributed resource and is received after the first notification.

18. The group application server of claim 11, wherein the processor is further configured to:
receive an acceptance of the request for establishment of the distributed resource in the broadcast area, wherein the acceptance is received before the first notification; and
receive a status indicating that the distributed resource has been established in the broadcast area, wherein the status is received after the first notification.

19. The group application server of claim 11, wherein the request for the indication of progress to establish the distributed resource is provided by an attribute-value pair.

20. The group application server of claim 11, wherein:
the request for the indication of progress to establish the distributed resource includes a resource activation threshold;
the first notification indicative of progress in the establishment of the distributed resource indicates whether the resource activation threshold has been reached.

\* \* \* \* \*